Patented Feb. 26, 1946

2,395,778

UNITED STATES PATENT OFFICE 2,395,778

VULCANIZATION OF OLEFIN-DIOLEFIN COPOLYMERS

Samuel Breck, Rutherford, and Earle S. Ebers, Nutley, N. J., assignors to United States Rubber Company, New York, N. Y., a corporation of New Jersey No Drawing. Application July 2, 1943,
Serial No. 493,286

3 Claims. (Cl. 260—41)

This invention relates to the vulcanization of olefin-diolefin copolymers, and more particularly those copolymers of an olefin and a diolefin which are known to the trade as butyl rubber, and which are referred to in British Patent No. 523,248, and in Ind. & Eng. Chem. 32, pp. 1283 et seq. (1940). Butyl rubber usually possesses less than 10% of the unsaturation of natural rubber.

It has been known to vulcanize the butyl type rubbers with tetramethyl thiuram disulfide together with sulfur, but such vulcanizates are characterized by low modulus, low resilience, and high hysteresis. To obtain more satisfactory vulcanizates a combination of p-quinone dioxime and lead dioxide has been used. This gave a higher modulus, higher resilience, and lower hysteresis, and had the further advantage of requiring a lower temperature and a shorter time to reach optimum cure, compared with the use of sulfur and a thiuram accelerator. However, the dioxime-lead dioxide combination suffers from the disadvantage of being extremely scorchy on the mill, and in subsequent processing i. e., calendering, extruding, etc.

Scorch is defined as a premature partial vulcanization of the stock brought about by heat present or developed during processing. A scorched stock is no longer completely thermoplastic and cannot be smoothly sheeted or extruded. Scorch life, as determined by the Mooney plastometer, is a measure of the time during which the stock may be safely processed. The exact time will depend largely on processing temperature and to some extent on the processing operation being carried out. A Mooney scorch resistance (defined below) of ten minutes at 250° F. is considered satisfactory for factory processing of Hevea rubber tread stocks under ideal conditions. A longer time is desirable to provide a factor of safety.

In butyl rubber stocks containing carbon black the rate of scorch depends, particularly when the combination p-quinone dioxime—red lead is used as the curing agent, on the total carbon black surface present, the rate of scorch increasing rapidly with increasing carbon black surface. Carbon black is necessary to obtain satisfactory physical properties in butyl rubber vulcanized with p-quinone dioxime and an oxidizing agent, therefore the scorching of butyl rubber compounds involves a problem unique and distinctive from rubber processing.

Our invention relates to the vulcanization of butyl rubber by means of a combination of p-quinone dioxime, red lead and salicylic acid. The advantage of this combination over p-quinone dioxime and red lead alone is that it gives a compound having a much greater resistance to processing scorch but having essentially the same rate of cure at temperatures over 280° F. The combination is flexible in that the tendency to scorch can be reduced to any desired degree by increasing the amount of salicyclic acid in the mix without appreciably affecting the physical properties of the vulcanizate.

Accordingly, the invention consists in incorporating in butyl rubber 1 to 10% by weight of p-quinone dioxime, 5 to 20% by weight of red lead, and a small amount of salicylic acid, preferably in the range .1 to 5% by weight, and heating the mixture to effect vulcanization. These materials are preferably added to butyl rubber on a mill or internal mixer, the salicylic acid being added first to prevent scorching of the mix on the subsequent addition of the vulcanizing agents. The chemicals may be added, in the order named above, at any time during the mixing procedure, but preferably at the end, in the same manner as sulfur and sulfur accelerators are added in natural rubber mixes. Other compounding ingredients may be any that are desired such as fillers, pigments, antioxidants and softeners. An example is given below in which stocks A and B represent the invention, and stock C the prior art. The parts are by weight:

|  | A | B | C |
|---|---|---|---|
| Butyl rubber | 100 | 100 | 100 |
| Stearic acid | 3 | 3 | 3 |
| Channel black | 60 | 60 | 60 |
| Salicylic acid | 2 | 0.5 | 0 |
| p-Quinone dioxime | 2 | 2 | 2 |
| Red lead | 10 | 10 | 10 |
| Mooney plastometer scorch resistance at 250° F.[1] minutes | 9 | 5 | 1 |

[1] Time at which the rate of increase of the Mooney viscosity reaches a value of 2 units per minute at 250° F.

|  | Press cure (in minutes at 293° F.) | A | B | C |
|---|---|---|---|---|
| Tensile (lbs. per sq. in.) at break | 15 | 1,600 |  | 2,000 |
|  | 45 | 1,700 | 2,200 | 1,900 |
|  | 60 | 1,750 |  | 2,000 |
| Modulus at 300% elongation | 15 | 550 |  | 600 |
|  | 45 | 650 |  | 700 |
|  | 60 | 700 |  | 850 |
| Percent elongation at break | 15 | 620 |  | 640 |
|  | 45 | 570 | 630 | 590 |
|  | 60 | 560 |  | 550 |
| Tensile (lbs. per sq. in.) at 212° F. | 15 | 241 |  | 941 |
|  | 45 | 719 | 1,200 | 1,000 |
|  | 60 | 867 |  | 922 |

*Hysteresis under conditions of constant shearing strain (energy loss in ergs/cm.³ of rubber)*

|  | A | C |
|---|---|---|
| Hysteresis measured at R. T. (45 min. at 293° F. cure). | 11.3×10⁶ ergs/cm.³ | 12.8×10⁶ ergs/cm.³ |
| Hysteresis measured at 280° F. (45 min. at 293° F. cure). | 5.0×10⁶ ergs/cm.³ | 5.2×10⁶ ergs/cm.³ |

The data show that butyl rubber compounded with the new vulcanizing combination according to the invention has high scorch resistance at 250° F., whereas butyl rubber compounded with curing agents consisting of p-quinone-dioxime and red lead only, according to prior art, scorches rapidly at that temperature. The data also show that vulcanizates made according to the invention have satisfactory tensile strength, modulus, and resilience.

Having thus described our invention, what we claim and desire to protect by Letters Patent is:

1. A method of vulcanizing an elastomer which is a copolymer of a major proportion of a mono-olefin and a minor proportion of a conjugated diolefin which comprises heating the elastomer after admixture with para-quinone dioxime, red lead, and salicylic acid.

2. A mixture comprising an elastomer which is a copolymer of a major proportion of a mono-olefin and a minor proportion of a conjugated diolefin, para-quinone dioxime, red lead, and salicylic acid.

3. The vulcanization product of a mixture comprising an elastomer which is a copolymer of a major proportion of a mono-olefin and a minor proportion of a conjugated diolefin, carbon black, para-quinone dioxime, red lead, and salicylic acid.

SAMUEL BRECK.
EARLE S. EBERS.